W. W. WILSON.
Corn Planter.

No. 34,176.

Patented Jan. 14, 1862.

Witnesses:

Inventor:
W. W. Wilson, per Munn & Co.
Attys.

UNITED STATES PATENT OFFICE.

W. W. WILSON, OF COLLINS STATION, ILLINOIS.

IMPROVEMENT IN CORN-PLANTERS.

Specification forming part of Letters Patent No. 34,176, dated January 14, 1862.

*To all whom it may concern:*

Be it known that I, W. W. WILSON, of Collins Station, in the county of Clinton and State of Illinois, have invented a new and Improved Corn-Planter; and I do hereby declare the following to be a full, clear, and exact description of the same, reference being had to the accompanying drawings, making a part of this specification, in which—

Figure 1:
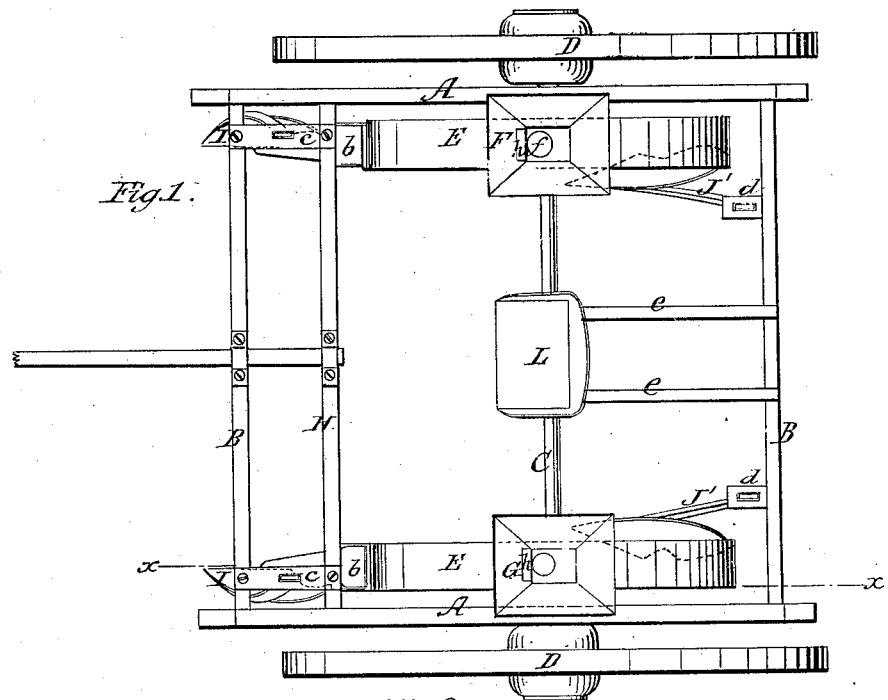
Figure 2:
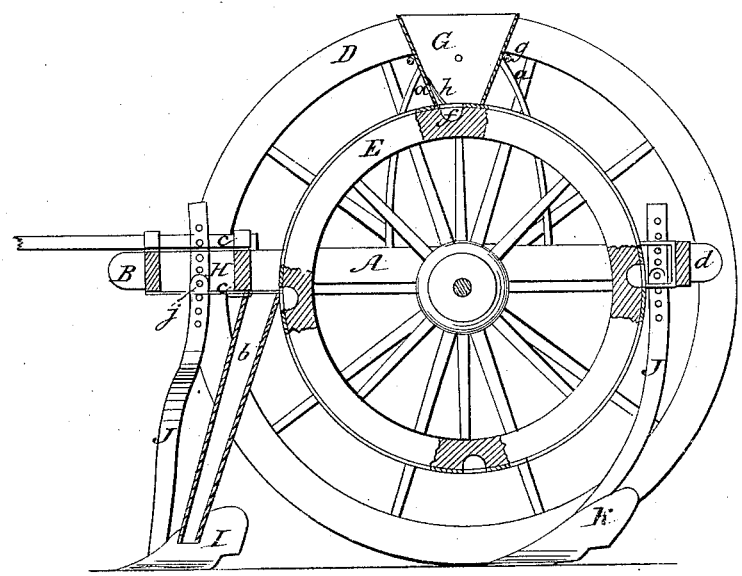

Figure 1 is a top view of my corn-planter. Fig. 2 is a longitudinal section of the same, taken at the line $x\ x$ of Fig. 1.

Similar letters of reference indicate corresponding parts in the two figures.

This invention relates to that class of machines which form the furrow, deposit the seed, and cover it at one operation; and it consists in a simple arrangement of seed-distributing device and adjustable plows, whereby the implement is made to work with unerring accuracy and adapted to plant to any desired depth.

To enable others skilled in the art to fully understand and construct my invention, I will proceed to describe it.

A A represent the side pieces, and B B the end pieces, of a rectangular frame, which is mounted upon an axle, C, supported on common carriage-wheels D D, one of which is fitted to revolve loosely on the axle to facilitate the turning of the machine, and the other is rigidly secured on the opposite end of the axle to impart motion to the seed-distributing wheels. The wheels may, if desired, both be journaled loosely on the axle, and be provided with a ratchet arrangement, so that only the forward movement of the wheels shall impart motion to the seed-distributing device.

E E are the seed-distributing wheels, which are rigidly secured upon the axle C inside of the frame, and are furnished on their periphery with a series of seed cells or cups, $f$, placed equidistant apart.

The seed-hoppers F G are constructed with downwardly-converging sides, and are supported in a frame immediately over the axis of the wheels by rods $a\ a$, which are attached on opposite sides of the axle to the side pieces of the frame. The hoppers at bottom are left open, and are fashioned so as to conform to the periphery of the distributing-wheels, which revolve in close proximity thereto, and prevent the seed from passing under the sides of the hopper, except in the cups in the periphery of the wheels. The front sides of the hoppers have a brush, $h$, attached to them, to keep back the surplus corn and prevent the distributing device from clogging.

H is a cross-beam secured to the frame in front of the distributing-wheels. Depending from the back side of this beam, and immediately in front of the distributing-wheels, are conducting-tubes $b\ b$, which are made of rectangular shape at top to allow the wheels to work close up to them to deposit the seed contained in the cups as the wheels are revolved.

I I are the furrow or drill plows, attached to the lower end of the standards J, which are fitted to move up and down in openings made in guides $c\ c$, attached above and below the front end piece, B, and beam H. The standards at their upper ends have a series of holes made through them, through which and lugs $j$, formed on the upper side of the lower guide, a pin is passed to secure the plows in position, so as to cut a shallow or deep furrow, as may be desired, or to elevate the plows entirely from the ground when it is desired to transport the machine to and from the field.

K K are plows similar to those before described, arranged behind the distributing-wheels, so as to cover up the seed deposited in the drills. The shares of these plows are reversed from the furrow-plows, so as to take the dirt thrown out by them to cover the seed. The standards J are fitted in openings in the double brackets $d$, and are adjustable vertically therein by means of pins passing laterally through the brackets and through holes in the standards.

The seat L is mounted upon the ends of two springs, $e$, which are attached to the back end piece of the framing. The tongue to which the draft-animals are hitched is attached to the upper side of the frame by means of the box-brackets.

The operation is as follows: The plows being properly adjusted, the seed is placed in the hoppers and the machine put in motion. As it advances the plows in front open the furrow, and at regular intervals one of the cups in the distributing-wheels is brought over the conducting-tube, when it deposits a few kernels of corn into it, which are conducted down into the furrow immediately behind the furrow-plow, and as the machine still further advances the plows behind cover the seed and leave the ground in the best condition for quick germination.

The within-described improved corn-planter is very simple in its construction, there being no gearing or anything about it that is liable to get out of order. It is light and portable and works with great regularity and precision.

Having thus described my invention, what I claim as new, and desire to secure by Letters Patent, is—

The distributing-wheels E, cups $f$, hoppers F G, frames $g$, rods $a$, conducting-tubes $b$, adjustable plows I, standards J J, guides $c$, and double brackets $d$, with the frame of the machine, when combined, arranged, and operating in the manner described.

WM. W. WILSON.

Witnesses:
BILLINGS GRINNELL,
JAMES WILEY.